N. A. PALMGREN.
DOUBLE ACTING THRUST BALL BEARING.
APPLICATION FILED JUNE 24, 1919.

1,342,756.

Patented June 8, 1920.

Inventor:
Nils Arvid Palmgren
By Attys
Fraser, Fink & Myers

UNITED STATES PATENT OFFICE.

NILS ARVID PALMGREN, OF GOTTENBORG, SWEDEN, ASSIGNOR TO S. K. F. ADMINISTRATIVE COMPANY, INC., OF NEW YORK, N. Y.

DOUBLE-ACTING THRUST BALL-BEARING.

1,342,756.　　　　Specification of Letters Patent.　　Patented June 8, 1920.

Application filed June 24, 1919. Serial No. 306,416.

*To all whom it may concern:*

Be it known that I, NILS ARVID PALMGREN, a subject of the King of Sweden, residing at Gottenborg, in the Kingdom of Sweden, have invented new and useful Improvements in Double-Acting Thrust Ball-Bearings, of which the following is a specification.

In double-acting thrust ball bearings the inconvenience will easily arise that the half of the bearing occasionally unloaded will slacken on the compression of the loaded half, the balls, owing to their weight or the centrifugal force, thereby being displaced from their normal positions and then, especially when reversing the direction of pressure within the bearing, exposed to jamming and overloading.

This invention relates to ball bearings of the type above mentioned and has for its object to prevent the said inconveniences. To this end the thrust bearing proper is kept together by a sleeve inclosing the said bearing or disposed within the same and being elastic or resilient in the longitudinal direction by being provided with slits.

Several embodiments of the invention are illustrated in the accompanying drawing in which—

Figure 1:
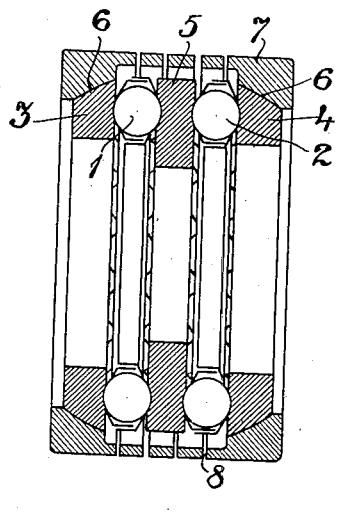
Figure 2:
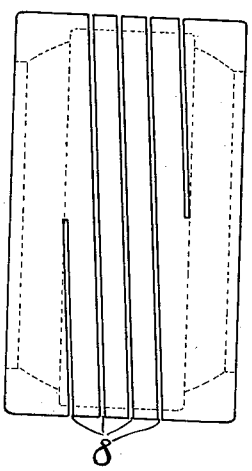
Figure 3:
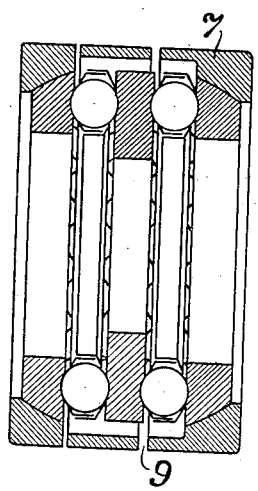
Figure 4:
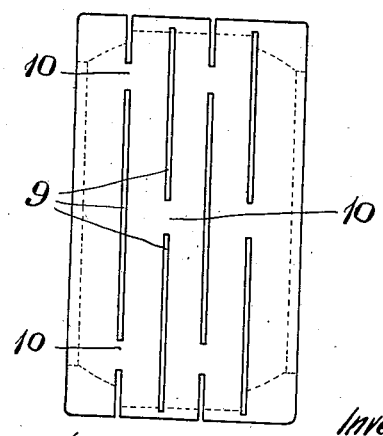

Figure 1 is an axial longitudinal section of a ball bearing constructed according to the invention. Fig. 2 is a side view of the sleeve used in connection with said bearing. Fig. 3 is an axial longitudinal section of another embodiment of the bearing and Fig. 4 shows a side view of the sleeve used in the latter bearing.

Referring to Figs. 1 and 2, the double-acting thrust bearing contains two rows of balls 1 and 2 placed between two outer thrust rings 3 and 4 and an intermediate thrust ring 5 adapted to be connected with the shaft of the bearing and to rotate with the same.

The thrust rings 3 and 4 are preferably provided with outer spherical bearing surfaces 6 bearing against corresponding spherical surfaces on the inner side of a surrounding sleeve 7, the thrust bearing thus being self-adjusting in relation to the sleeve. The bearing is assembled in the usual manner by the sleeve being provided with axial notches through which the thrust rings kept together as a single body are introduced in a position forming right angles with their normal position in the bearing and then turned to the proper position. The construction of the bearing itself described above is known *per se*.

In order to keep together the half of the bearing occasionally unloaded, the sleeve 7 is provided with a helical slit 8 enabling the sleeve in its totality to act as a spring keeping together the thrust bearing proper and preventing the half of the bearing occasionally unloaded from becoming slack.

The embodiment shown in Figs. 3 and 4 differs from that described above only in that the resiliency of the sleeve 7 is effected by the cover being slit at right angles to the shaft of the bearing, a series of slits 9 each of which extends along a portion of the circumference of the sleeve being provided. The slits positioned in one and the same plane are spaced apart by shorter, whole intervals 10 arranged in staggered relation to corresponding intervals of the adjacent planes, the cover thus being resilient or elastic in the longitudinal direction and capable of keeping together with an elastic pressure the half of the bearing occasionally unloaded.

Having now particularly described and ascertained the nature of my said invention and in what manner the same is to be performed, I declare that what I claim is:—

1. In a double-acting thrust ball bearing, a sleeve inclosing the thrust bearing proper and being elastic in the longitudinal direction.

2. In a double-acting thrust ball bearing, a sleeve inclosing the thrust bearing proper and being slit so as to be elastic in the longitudinal direction.

3. In a double-acting thrust ball bearing, a sleeve inclosing the thrust bearing proper and provided with slits arranged in planes at right angles to the shaft.

4. In a double-acting thrust ball bearing, a sleeve inclosing the thrust bearing proper and provided with slits arranged in planes at right angles to the shaft, each of the slits in each plane extending along a portion of the circumference of the sleeve.

5. In a double-acting thrust ball bearing, a sleeve inclosing the thrust bearing proper and arranged to keep together resiliently the half thereof occasionally unloaded, said sleeve being slit so as to be elastic in the longitudinal direction.

In testimony whereof I have signed my name.

NILS ARVID PALMGREN.